United States Patent

[11] 3,607,812

| [72] | Inventors | Bin Takigawa;<br>Akio Wakabayashi; Tanio Hayashi;<br>Masanori Kasagi, all of Tokyo, Japan |
|---|---|---|
| [21] | Appl. No. | 784,471 |
| [22] | Filed | Dec. 17, 1968 |
| [45] | Patented | Sept. 21, 1971 |
| [73] | Assignee | Denki Kagaku Kogyo Kabushiki Kaisha<br>Tokyo, Japan |

[54] METHOD OF MANUFACTURING POLYVINYL ALCOHOL FILMS AND PRODUCT
8 Claims, No Drawings

[52] U.S. Cl. .................................................. 260/29.6 B,
260/33.4 R, 260/91.3 VA, 264/95, 264/185,
264/209, 264/211
[51] Int. Cl. .................................................. B29f 3/00,
D01f 1/02
[50] Field of Search .......................................... 264/185,
211, 95; 260/29.6 B, 33.4 R

[56] References Cited
UNITED STATES PATENTS

| 3,409,598 | 11/1968 | Takigawa et al. | 264/185 |
| 3,425,979 | 2/1969 | Monaghan et al. | 264/95 |

*Primary Examiner*—Robert F. White
*Assistant Examiner*—Gene Auville
*Attorney*—Kemon, Palmer & Estabrook

ABSTRACT: A method of manufacturing a polyvinyl alcohol film insoluble in water at a temperature below 40° C. by adding 13 to 5 parts by weight of a polyhydric alcohol plasticizer to 87 to 95 parts by weight of polyvinyl alcohol resin which has a polymerization degree of from 700 to 1,500 and a hydrolysis degree of at least 97 mol percent and contains less than 0.5 percent by weight of sodium acetate, drying the mixture to reduce the moisture content to less than 2 percent by weight and finally melt extruding the mass into a film with a die heated to temperatures of from 190° to 250° C.

METHOD OF MANUFACTURING POLYVINYL ALCOHOL FILMS AND PRODUCT

The present invention relates to manufacturing polyvinyl alcohol films and more particularly to a method of manufacturing polyvinyl alcohol films which are insoluble in cold water at a temperature below 40° C., but readily soluble in warmer water.

It is already known that films prepared from polyvinyl alcohol resin having a relatively high degree of hydrolysis have a nature of being insoluble in cold water, but soluble in warm water. Such nature makes the film available for use as a hospital bag or the packing material of such products as detergents, agricultural chemicals.

The manufacture of the aforementioned film from polyvinyl alcohol resin having a high degree of hydrolysis has heretofore been carried out by either casting or extrusion of an aqueous solution or aqueous swollen polyvinyl alcohol resin, unlike many other thermoplastic resins. The reason is that the polyvinyl alcohol resin increases in melting viscosity as its degree of hydrolysis rises, so that to bring the resin to a suitable condition for melt extrusion, the resin must be heated to a temperature approaching its decomposition point. Melt extrusion at such temperatures as are close to the decomposition point will result in a film of low commercial value which is undesirably colored yellow due to the partial decomposition of the resin and will also obstruct a stable operation all the more, where a long run could otherwise be expected.

With the casting method, though it is free from drawbacks arising from excess heating accompanying the melt extrusion, it is still required that a solution of the plasticizer-containing resin poured on an endless surface be dried gently in order to obtain a film of good quality. Also with the extrusion of the resin in the form of aqueous solutions or aqueous gels, it is necessary that the large water content of the extruded material be evaporated under rigid process control. Further, if it was attempted to apply the inflation extrusion in the latter case, it would be practically infeasible due to the blocking (a phenomenon where films adhere to each other) caused by the difficulty of fully drying the inner surface of the inflated film.

An object of the present invention is to provide a method of manufacturing polyvinyl alcohol resin films having a high degree of hydrolysis, namely, those which are insoluble in cold water at a temperature below 40° C. but soluble in warm or hot water, using the same melt extrusion process as is practiced with many thermoplastic resins.

The method according to the present invention comprises mixing (a) 87 to 95 parts by weight of polyvinyl alcohol resin having a polymerization degree of from 700 to 1,500 and a hydrolysis degree of at least 97 mol percent and containing less than 0.5 percent by weight of sodium acetate with (b) 13 to 5 parts by weight of a polyhydric alcohol plasticizer compatible with the polyvinyl alcohol resin, drying the mixture to reduce the moisture content to less than 2 percent by weight and melt extruding the dried mass into a film at die temperatures of from 190° to 230° C.

According to the method of the present invention, there is used polyvinyl alcohol resin having specific degree of polymerization and hydrolysis and containing extremely small amounts of sodium acetate, and this resin is mixed with a polyhydric alcohol plasticizer in the aforementioned range of proportions. The mixture permits melt extrusion into a substantially moisture free film by the method used with ordinary thermoplastic resins without causing any difficulties. The only requisite for melt extrusion is actually the control of die temperatures. The resultant film does not exhibit any tendency toward blocking either during or after manufacture. Moreover, it has a favorable feature of being insoluble in water at a temperature below 40° C., but readily soluble in warmer water.

The method of the present invention permits the use of any polyvinyl alcohol resin if it has a polymerization degree of from 700 to 1,500 and a hydrolysis degree of at least 97 mol percent, no matter how it is prepared. If the polyvinyl alcohol resin consists of dried particles and contains more than 0.5 percent by weight of sodium acetate, as an impurity, it must be subjected to a treatment of removing the sodium acetate. Such removal will be favorably effected by washing the resin particles with water, methanol or a mixture thereof. Alternatively, it may be advisable to add proper amounts of a strong acid to the resin so as to neutralize the acidity of sodium acetate and convert it to a substantially harmless material.

More preferably, the polyvinyl alcohol resin film should be prepared from the resin whose content of sodium acetate has been reduced to less than 0.5 percent by weight. A resin containing such extremely small amounts of sodium acetate can be obtained by washing with methanol the wet cake produced after hydrolysis involved in the synthetic process of polyvinyl alcohol.

When the polyvinyl alcohol resin used contains more than 0.5 percent by weight of sodium acetate, experiments show that there evolve odorous decomposition gases from the neighborhood of a die at the time of melt extrusion and the film thus prepared is undesirably colored yellow. It is believed that an excess content of sodium acetate will accelerate the thermal decomposition of polyvinyl alcohol by a reaction whose mechanism is not fully understood. The reason is that where separately prepared pure sodium acetate is added to polyvinyl alcohol resin substantially free therefrom, increasing additions of said acetate are observed to give rise to the prominent decomposition and unfavorable yellow coloration of the extruded product.

The useful mechanical strength of the produced film depends on the polymerization degree of the polyvinyl alcohol resins which are preferably polymerized to more than 700, or more preferably more than 900. A polyvinyl alcohol resin having a polymerization degree of more than 700 provides a film of useful mechanical strength for general uses, and a polyvinyl alcohol resin whose polymerization degree exceeds 900 produces a film having sufficient mechanical strength including tensile strength, elongation, tear strength, etc. On the other hand, use of a polyvinyl alcohol resin having a polymerization degree of more than 1,500 makes it difficult to carry out melt extrusion without coloring because the temperature of such melt extrusion approaches the decomposition temperature of the resin.

The hydrolysis degree of the polyvinyl alcohol resin used substantially influences the water solubility of the resultant film. A polyvinyl alcohol resin film insoluble in water at a temperature below 40° C., but soluble in warmer water can be prepared from polyvinyl alcohol resin having a hydrolysis degree exceeding 97 mol percent. If there is used polyvinyl alcohol resin whose degree of hydrolysis is below 97 mol percent the resultant film will have an undesirable nature of being readily soluble in water at a temperature of even less than 40° C. According to the method of the present invention, a suitable composition for melt extrusion derived from the polyvinyl alcohol resin as specified above is prepared by mixing 87 to 95 parts by weight of said resin with 13 to 5 parts by weight of a polyhydric alcohol plasticizer compatible with said resin.

A composition containing a plasticizer within the aforesaid range of proportions exhibits sufficient fluidity under the conditions of melt extrusion. If the proportions of the plasticizer decrease from the lower limit of said range, there will not be obtained a necessary fluidity for smooth melt extrusion. Conversely, where the plasticizer content exceeds the upper limit of said range, the resultant film will be rendered unduly sticky which will lead to blocking. Exemplary of advantageous polyhydric alcohol plasticizers are ethylene glycol, triethylene glycol, polyethylene glycol, glycerine and trimethylol propane. Among these plasticizers, the glycerine can be used with the greatest advantage in that it exerts a prominent plasticizing effect on a highly hydrolyzed material as used in the method of the present invention.

The aforesaid polyhydric alcohol may be added to the polyvinyl alcohol resin by any known means. For instance, the polyvinyl alcohol resin and plasticizer may be mixed with stirring in a suitable blender. If there is desired a more uniform mixture, it may be advisable to add a methanol solution of the plasticizer to the polyvinyl alcohol resin and dry the mixture to remove the methanol. The film composition may be incorporated, if necessary, with lubricants such as stearic acid, suitable pigments or other additives. These additives may be introduced either when the polyvinyl alcohol resin is mixed with the plasticizer or thereafter.

The present invention is further characterized in that the film composition consisting of a polyvinyl alcohol resin, polyhydric alcohol plasticizer and an additive such as a lubricant, if incorporated, is dried before melt extrusion so as to reduce its moisture content to below 2 percent by weight. This drying is carried out by ordinary means, for example, air drying or vacuum drying. If the moisture content of a film composition exceeds 2 percent by weight (a polyvinyl alcohol resin in common use generally contains around 5 percent by weight of moisture due to its hydrophilic nature and moreover hygroscopic polyhydric alcohol contains high percentages of moisture so that the overall moisture content of the film composition generally ranges between 5 to 10 percent by weight), then there will evolve steam in melt extrusion, leading to the formation of fine apertures in the film. If melt extrusion is carried out by inflation, the occurrence of such apertures will cause the air introduced into the inflated cylindrical film to leak therethrough, thus obstructing subsequent operations.

According to the method of the present invention, the melt extrusion of a film composition is only restricted by the die temperature, the preferable range of which lies between 190° C. and 230° C. So long as the die temperature is maintained within this range, there can be prepared the desired film by an ordinary melt extruder under the same conditions as are used with many thermoplastic resins. Further, employment of a melt extruder provided with an annular die under the ordinary inflation conditions permits a cylindrical film to be prepared with any thickness available for practical use, for example, a thickness of 10 to 80 microns. Or use of a T-die will produce a flat film of any desired thickness.

There will now be described the method of the present invention by reference to the examples which follow. It will be understood, however, that they are only offered by way of illustration and that they should not be construed to restrict the scope and breadth of the invention or limit the scope of the patent claims appended hereto. The term "parts" as used throughout these examples means parts by weight.

Example 1

A polyvinyl alcohol resin having a polymerization degree of 800 and a hydrolysis degree of 99.5 mol percent was washed with cold water to reduce the content of sodium acetate to 0.3 percent by weight. Over 100 parts of the washed resin was sprayed a solution prepared by dissolving 8 parts of glycerine and 0.2 part of stearic acid in 50 parts of methanol.

The mass was stirred in a mixer for uniform mixing. The wet mass was kept 6 hours in a sealed vessel at 50° C. for homogenization of the respective components, and thereafter dried 5 hours in a hot air drier at 80° C. to reduce the moisture content to 0.3 percent by weight.

The dried composition was charged into a melt extruder provided with a screw 15 mm. in diameter and a cylinder 300 mm. long (L/D=20). The melt extruder was operated with the cylinder heated to temperatures ranging from 210° to 230° C. and the die to 215° C. The melted composition was air inflated into a cylindrical film about 100 mm. in diameter by passing through a die having an annular opening 25 mm. in inner diameter and 0.3 mm. wide. The resultant product was a colorless, transparent and tough film 0.05 mm. thick and having a nature of being insoluble in water at a temperature below 40° C. and readily soluble in water at 80° C.

Example 2

A wet cake containing polyvinyl alcohol which was obtained after hydrolysis involved in the ordinary method of manufacturing polyvinyl alcohol and had a polymerization degree of 1,200 and a hydrolysis degree of 98 mol percent was washed with methanol to reduce the content of sodium acetate to 0.4 percent by weight, followed by drying. To 100 parts of the dried polyvinyl alcohol resin were added 10 parts of glycerine and 0.2 part of stearic acid, followed by mixing 1 hour in a blender. The mixture was dried about 12 hours in a vacuum drier at 60° C. and 10 mm. Hg to reduce the moisture content to 0.2 percent by weight. The said mixture was extruded into a film under the same conditions as in example 1 excepting that the die temperature was changed to 230° C. There was obtained a colorless, transparent and tough film insoluble in water at 40° C., but quickly soluble in water at 60° C.

Example 3

Three compositions as listed below were prepared in the same manner as in example 1.

|  | 1 | 2 | 3 |
| --- | --- | --- | --- |
| Polyvinyl alcohol (part) | 90 | 88 | 87 |
| Polymerisation degree | 800 | 1,200 | 1,400 |
| Hydrolysis degree (mol %) | 98.5 | 98.5 | 97.5 |
| Sodium acetate content (wt %) | 0.3 | 0.4 | 0.4 |
| Glycerine (part) |  | 8 | 13 |
| Triethylene glycol (part) | 10 | 4 |  |
| Stearic acid (part) | 0.2 | 0.2 | 0.2 |

The above compositions were extruded into a film under the same conditions as in example 2. The three films obtained had a desirable nature of being insoluble in water at temperatures below 40° C., but easily soluble in water at temperatures of from 60° to 80° C.

Example 4

A composition with 0.5 percent by weight of moisture consisting of 88 parts of polyvinyl alcohol having a polymerization degree of 800 and a hydrolysis degree of 99.3 mol percent and containing 0.2 percent by weight of residual sodium acetate, 12 parts of polyethylene glycol having an average molecular weight of 200 and 0.2 part of stearic acid, was made into a film in the same manner as in example 1 excepting that the die temperature was changed to 230° C. The film was insoluble in water at 40° C. but instantly soluble in water at 70° C.

Example 5

A composition with 0.7 percent by weight of moisture consisting of 95 parts of polyvinyl alcohol having a polymerization degree of 800, and a hydrolysis degree of 97.5 mol percent and containing 0.5 percent by weight of residual sodium acetate and 5 parts of trimethylol propane, was extruded into a film under the same conditions as in example 1 excepting that the die temperature was changed to 200° C. There was obtained a fully tough film insoluble in water at 40° C., but immediately soluble in water at 60° C.

Example 6

A composition with 0.2 percent by weight of moisture consisting of 87 parts of polyvinyl alcohol having a polymerization degree of 1,500 and a hydrolysis degree of 97.0 mol percent and containing 0.1 percent by weight of residual sodium acetate, and 13 parts of glycerine, was made into a film under the same conditions as in example 2 excepting that the die temperature was changed to 220° C. The film was insoluble in water at 40° C., but readily soluble in water at 75° C.

Example 7

Ninety-five parts of polyvinyl alcohol resin having a polymerization degree of 1,000 and a hydrolysis degree of 99.0 mol percent were made to swell by immersion in 1,000 parts of water. Water was centrifuged out of the resin to reduce the content of sodium acetate from the original 0.6 percent by weight to 0.1 percent by weight.

Ninety-one parts of the polyvinyl alcohol resin thus dehydrated were mixed with 9 parts of ethylene glycol, and the mixture thus obtained was dried to reduce the moisture content of the mixture to 0.8 percent by weight. The composition was inflated into a cylindrical film through a die having an annular opening 50 mm. in inner diameter and 0.5 mm. wide, using an extruder comprising a screw 30 mm. in diameter and a cylinder 840 mm. long (L/D =28) and having a compression ratio of 3.0, with the cylinder heated to a temperature of from 220° to 230° C. and the die to 210°±3° C. There was obtained a cylindrical film having a thickness ranging between 15 and 100 microns by varying the extrusion velocity from 3 to 10 kg./hr. and also with a diameter ranging from 100 to 400 mm. by properly selecting the air pressure within the cylindrical film. The film thus prepared presented no yellow color, and was insoluble in water at 40° C., but easily soluble in water at 75° C.

Example 8

A composition consisting of 88 parts of polyvinyl alcohol having a polymerization degree of 910 and a hydrolysis degree of 97.2 mol percent and containing 0.3 percent by weight of residual sodium acetate and 12 parts of glycerine was dried to reduce the moisture content to 1.8 percent by weight. The composition was extruded into a film using the melt extruder as in example 7 excepting that a T-die was employed in place of an annular one, with the die heated to 90° C. There was obtained a film 20 to 200 microns thick by varying the extrusion and takeup velocities. The film was insoluble in water at 40° C., but soluble in water at 60° C.

What is claimed is:

1. A method of manufacturing a polyvinyl alcohol film insoluble in water at a temperature below 40° C., which comprises mixing (a) 87 to 95 parts by weight of a polyvinyl alcohol resin having a polymerization degree of from 700 to 1,500 and a hydrolysis degree of at least 97 mol percent and containing less than 0.5 percent by weight of sodium acetate with (b) 13 to 5 parts by weight of a polyhydric alcohol plasticizer compatible with the polyvinyl alcohol resin, drying the mixture to reduce the moisture content to less than 2 percent by weight, and melt extruding the dried mixture into a film at a die temperature of from 190° to 230° C.

2. A method according to claim 1 wherein the ratio of the plasticizer to the polyvinyl alcohol resin is from 7:93 to 10:90.

3. A method according to claim 1 wherein the die temperature is so controlled as to range from 210° to 220° C.

4. A method according to claim 1 wherein said melt extrusion is carried out in the form of inflation extruding.

5. A method of manufacturing a polyvinyl alcohol film insoluble in water at a temperature below 40° C., which comprises mixing (a) 90 to 93 parts by weight of a polyvinyl alcohol resin having a polymerization degree of from 700 to 1,500 and a hydrolysis degree of at least 97 mol percent and containing less than 0.5 percent by weight of sodium acetate with (b) 7 to 10 parts by weight of plasticizer selected from the group consisting of ethylene glycol, triethylene glycol, polyethylene glycol, glycerine and trimethylol propane, drying the resultant mixture to reduce the moisture content to less than 2 percent by weight, and inflation extruding the dried mixture into a cylindrical film at a die temperature of from 210° to 220° C.

6. Polyvinyl alcohol film not soluble in water at temperatures below 40° C. and soluble in water at higher temperatures made by the method of claim 1.

7. A method of claim 2 wherein the plasticizer is glycerine.

8. A method of claim 1 wherein said plasticizer is selected from the group consisting of ethylene glycol, triethylene glycol, polyethylene glycol, glycerine and trimethylol propane.